US008016345B1

(12) United States Patent
Goddard et al.

(10) Patent No.: US 8,016,345 B1
(45) Date of Patent: Sep. 13, 2011

(54) OPERATOR CAB HAVING INWARDLY FOLDING ACCESS DOOR (75) Inventors: Aaron Goddard, Germantown, WI (US); Marvin Joray, Wentworth, SD (US); Robert Claas, Saukville, WI (US); Curtiss M. Lee, Arlington, SD (US); Anthony Saiia, Mequon, WI (US)

(73) Assignee: Gehl Company, West Bend, WI (US)

( * ) Notice: Subject to any disclaimer, the term of this patent is extended or adjusted under 35 U.S.C. 154(b) by 84 days.

(21) Appl. No.: 12/348,145

(22) Filed: Jan. 2, 2009

(51) Int. Cl.
*B60J 5/02* (2006.01)

(52) U.S. Cl. ......... 296/190.01; 296/190.11; 296/146.11; 296/146.8; 296/146.13

(58) Field of Classification Search ............. 296/190.01, 296/190.03, 190.11, 146.11, 146.8, 146.13; 49/126
See application file for complete search history.

(56) References Cited

U.S. PATENT DOCUMENTS

| | | | | |
|---|---|---|---|---|
| 2,249,273 A * | 7/1941 | Flogaus | .................. | 296/146.13 |
| 2,815,243 A * | 12/1957 | Campbell | ................ | 296/190.11 |
| 4,346,931 A * | 8/1982 | Merkle | .......................... | 296/148 |
| 4,392,669 A | 7/1983 | Martin, Jr. | | |
| 4,518,195 A * | 5/1985 | Tindall et al. | ................. | 296/148 |
| 4,807,924 A * | 2/1989 | Kottke | .......................... | 296/164 |
| 5,272,836 A * | 12/1993 | Gerst et al. | ...................... | 49/126 |
| 5,362,118 A * | 11/1994 | Houriez | ..................... | 296/96.21 |
| 5,551,826 A | 9/1996 | Todd et al. | | |
| 5,722,108 A * | 3/1998 | Sakyo et al. | ................ | 15/250.19 |
| 5,906,411 A | 5/1999 | Stauffer et al. | | |
| 6,068,327 A | 5/2000 | Junginger | | |
| 6,257,651 B1 * | 7/2001 | Morbach et al. | ......... | 296/146.13 |
| 6,382,711 B2 | 5/2002 | Martin, Jr. | | |
| 6,435,596 B1 * | 8/2002 | Pyo | ................................ | 296/106 |
| 6,505,882 B1 * | 1/2003 | Morbach et al. | ......... | 296/146.11 |
| 6,543,563 B1 | 4/2003 | Muraro | | |
| 6,669,272 B2 * | 12/2003 | Ayabe et al. | ............. | 296/190.08 |
| 6,733,063 B2 * | 5/2004 | Paiva et al. | ...................... | 296/56 |
| 7,073,847 B2 * | 7/2006 | Morrow et al. | .......... | 296/190.11 |
| 7,080,708 B2 | 7/2006 | Wherley | | |
| 7,097,237 B2 | 8/2006 | Weiner et al. | | |
| 7,144,061 B1 | 12/2006 | Behm et al. | | |
| 7,246,846 B2 | 7/2007 | Shioji et al. | | |
| 7,575,272 B2 * | 8/2009 | Ishii et al. | ................ | 296/190.04 |
| 7,585,016 B2 * | 9/2009 | Wehrenberg | ............. | 296/190.11 |
| 2001/0008346 A1 | 7/2001 | Martin, Jr. | | |
| 2003/0175105 A1 | 9/2003 | Hilvers et al. | | |
| 2005/0104416 A1 | 5/2005 | Richards et al. | | |
| 2006/0028053 A1 | 2/2006 | Turnbaull et al. | | |
| 2006/0267379 A1 | 11/2006 | Johnson | | |
| 2007/0132277 A1 | 6/2007 | Ishii et al. | | |
| 2007/0145779 A1 | 6/2007 | Jones et al. | | |
| 2007/0145780 A1 | 6/2007 | Tecklenburg et al. | | |
| 2009/0192682 A1 * | 7/2009 | Ciarla et al. | ..................... | 701/49 |
| 2010/0032984 A1 * | 2/2010 | Murakami et al. | ........ | 296/190.03 |

* cited by examiner

*Primary Examiner* — Jason S Morrow
(74) *Attorney, Agent, or Firm* — Boyle Fredrickson, s.c.

(57) ABSTRACT

An operator cab for a skid steer vehicle is equipped with an inwardly folding front access door that can be locked in either a fully closed position or a fully open position. A pair of over-centered cylinders assists with closing and opening of the front access door. A lever, located in the operator cab, may be used to unlock the door from either its fully open position or its fully closed position. The skid steer vehicle may be operated effectively when the front access door is locked in the fully open position.

27 Claims, 10 Drawing Sheets

OPERATOR CAB HAVING INWARDLY FOLDING ACCESS DOOR

BACKGROUND AND SUMMARY OF THE INVENTION

The present invention is directed generally to a construction vehicle such as a skid steer vehicle and, more particularly, to an operator cab for a skid steer vehicle and having an inwardly folding access door.

Early skid steer vehicles, such as a skid loader, were designed to have an operator cab with a front opening that enabled the operator to easily enter and exit the operator cab through the front opening as well as communicate with ground workers during loading, moving, excavating or other operations. Some skid steer vehicles are equipped with a door that swings away from the front opening to selectively open and close the front opening. Operator cabs with front doors provide some advantages over conventional open operator cabs, including climate control, reduction of dirt and debris into the operator cab, and preventing unintended operator contact with working components of the vehicle, such as the lift arms.

One type of door configuration is the aforementioned swing-away door. In this configuration, the door is hinged or otherwise connected to an upright member of the operator cab and is free to swing away from the opening when an operator needs to enter or exit the operator cab. Similarly, when an operator positioned in the operator cab needs to communicate with a ground worker, the operator must either temporarily open the door or communicate through a side access window formed in the operator cab frame. In addition, if the operator wants to operate the skid steer vehicle with the door secured open, the operator must latch the door to the operator cab, which exposes the door to damage should the latch fail or if an object hits the door. Moreover, it may be necessary to exit the operator cab to latch the door in the open position.

Another type of door configuration commonly used with the operator cabs of skid steer vehicles is a roll-up door. Roll-up doors are designed to roll along a track carried within the interior of the operator cab. One advantage of roll-up doors over conventional swing away doors is that the door can be secured within the operator cab when the skid steer vehicle is being operated with the door in the open position. Nonetheless, to comply with applicable standards, roll-up doors require a sacrifice on the height of the operator cab or the amount of head room permitted in the operator cab. Moreover, the weight of roll-up door is such that if the latch that locks the door in the open position fails, the door will roll down and close the opening, which may injure the operator or damage the door itself.

The present invention is directed to an operator cab for a skid steer vehicle having an inwardly folding front access door. The door includes an upper panel and a lower panel connected to another at a joint that allows the lower panel to fold under the upper panel as the door is retracted into the operator cab. In a fully open position, the door is latched adjacent the undersurface of the upper panel of the operator cab. When the door is in the fully closed position, a separate latch locks the door within the front opening of the operator cab. An off-centered biasing member, such as a gas-assist cylinder, assists in holding the door closed when the door is in the closed position but also assists in holding the door open when the door in the open position.

Therefore, it is an object of the present invention to provide an operator cab for a skid steer vehicle with a front access door that can be locked in an open position with a minimal reduction in the headroom available within the operator cab.

It is yet another object of the invention to provide an operator cab for skid steer vehicle having a door that can be locked in the open position thereby allowing the skid steer vehicle to be operated even when the door is open.

It is a further object of the invention to provide a door for the operator cab of a skid steer vehicle that can be stowed or locked in a retracted and closed position within the operator cab when desired.

Therefore, in accordance with one aspect of the present invention, an operator cab for a skid steer vehicle is disclosed. The operator cab includes a cab frame that is positioned on a chassis of the skid steer vehicle. The cab frame has several frame members that collectively define an interior. The operator cab includes a front panel that is operable to selectively open and close the opening. The front panel folds inwardly at least partially into the interior of the cab frame to permit ingress to and egress from the interior.

In accordance with another aspect of the present invention, a skid steer vehicle includes a chassis and an operator cab mounted to the chassis. The operator cab defines a work space for an operator controlling operation of the skid steer vehicle. An access door is coupled to the frame and configured to retract into the work space. An over-center biasing member biases the access door in a retracted position and the bias of the biasing member must be overcome to secure the access door in either a closed position or an open position.

According to another aspect, the present invention includes an operator cab for a skid steer vehicle. The operator cab is comprised of a cab frame defining a cockpit and having an opening into the cockpit. A door is coupled to the frame and is operable to selectively open and close the opening. The door includes a first door member and a second door member that fold inwardly into the cockpit to permit ingress to or egress from the cockpit.

Various other features and advantages of the present invention will be made apparent from the following detailed description and the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
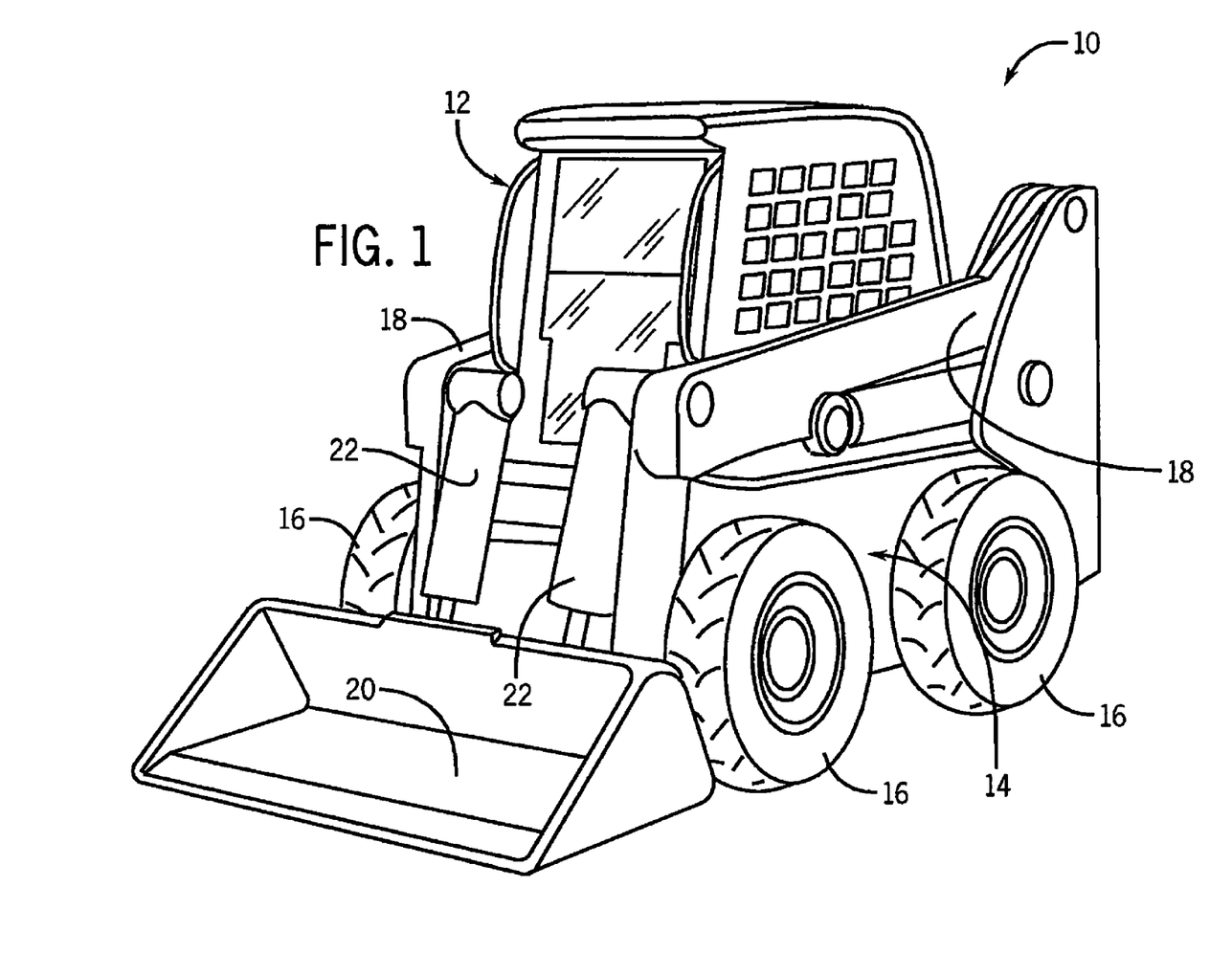
FIG. 1 is a pictorial view of a skid steer loader having an operator cab with an inwardly folding front access door.

The present invention is directed to an operator cab having an inwardly folding front access door for a skid steer loader 10, such as shown in FIG. 1. The skid steer loader 10 has an operator cab 12 that is secured in a known manner to a chassis 14. The chassis 14 supports two axles (not numbered) that each support two wheel and tire assemblies 16, as is known. The chassis 14 also supports a pair of lift arms 18 or booms that may lift bucket 20, or other attachment, such as a fork lift. Tilt arms 22 are coupled to the lift arms 18 and operate to tilt the bucket 20. The lift arms 18 and the tilt arms 22, as well operation of the loader 10 in general, are controlled by controls (not shown), such as joysticks, levers, push buttons, etc., contained within the operator cab 12.

Figure 2:
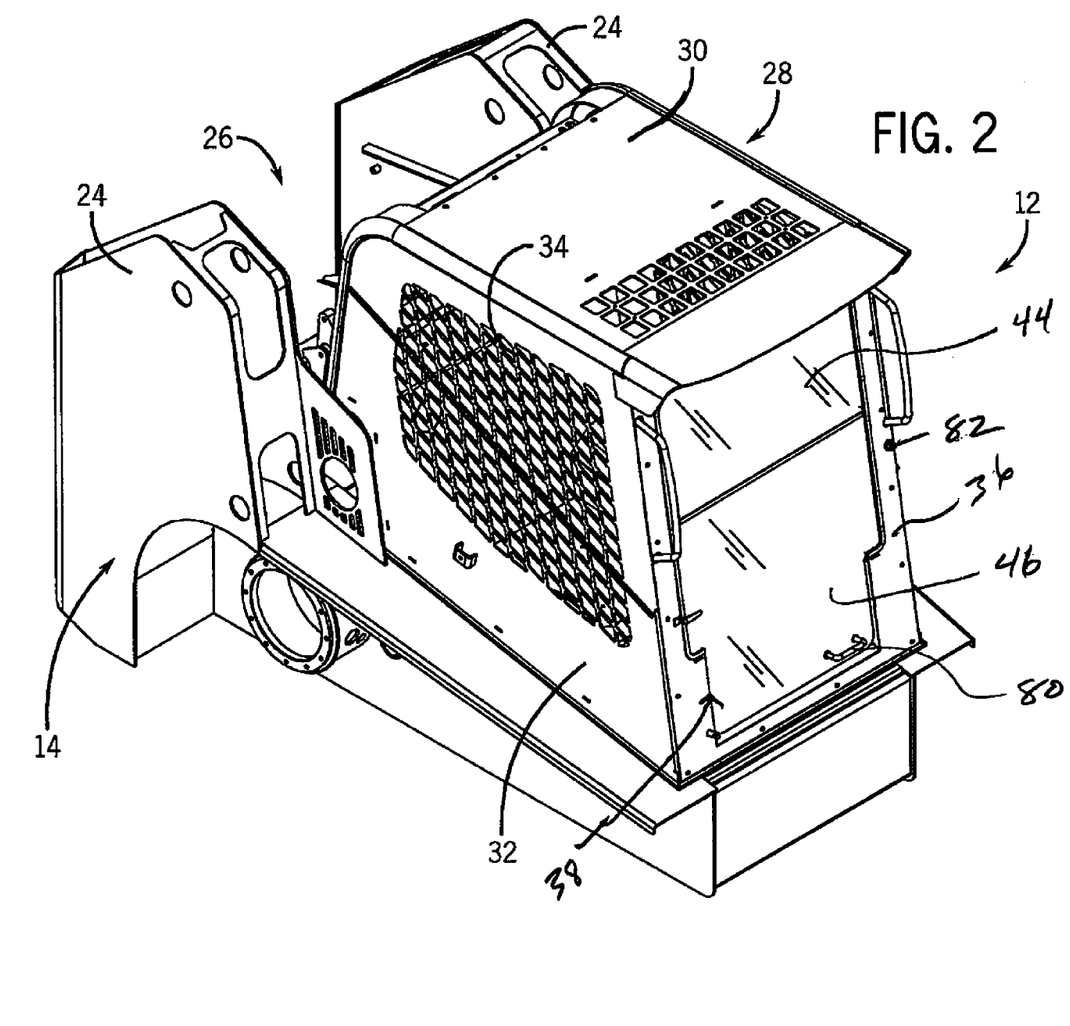
FIG. 2 is an isometric view of the operator cab mounted to a chassis of the skid steer loader shown in FIG. 1 and with the front access door in a closed position.

In general, the chassis 14 includes two posts 24 for mounting the lift arms 18 to the chassis 14 as shown in FIG. 2. The mounting posts 24 are positioned near the rear of the chassis 14 and are separated from one another so that a space 26 is defined therebetween. The operator cab 12 has a cab frame 28 that is supported by the chassis 14 generally forward of the space 26. The cab frame 28 includes a top panel 30, a pair of side panels 32, a rear panel 34, and a front panel 36. The operator cab 12 further includes a front access door 38, which fits in an opening 39, FIG. 5, of the front panel 36. In FIG. 2, the front access door 38 is shown in a closed position.

Figure 3:
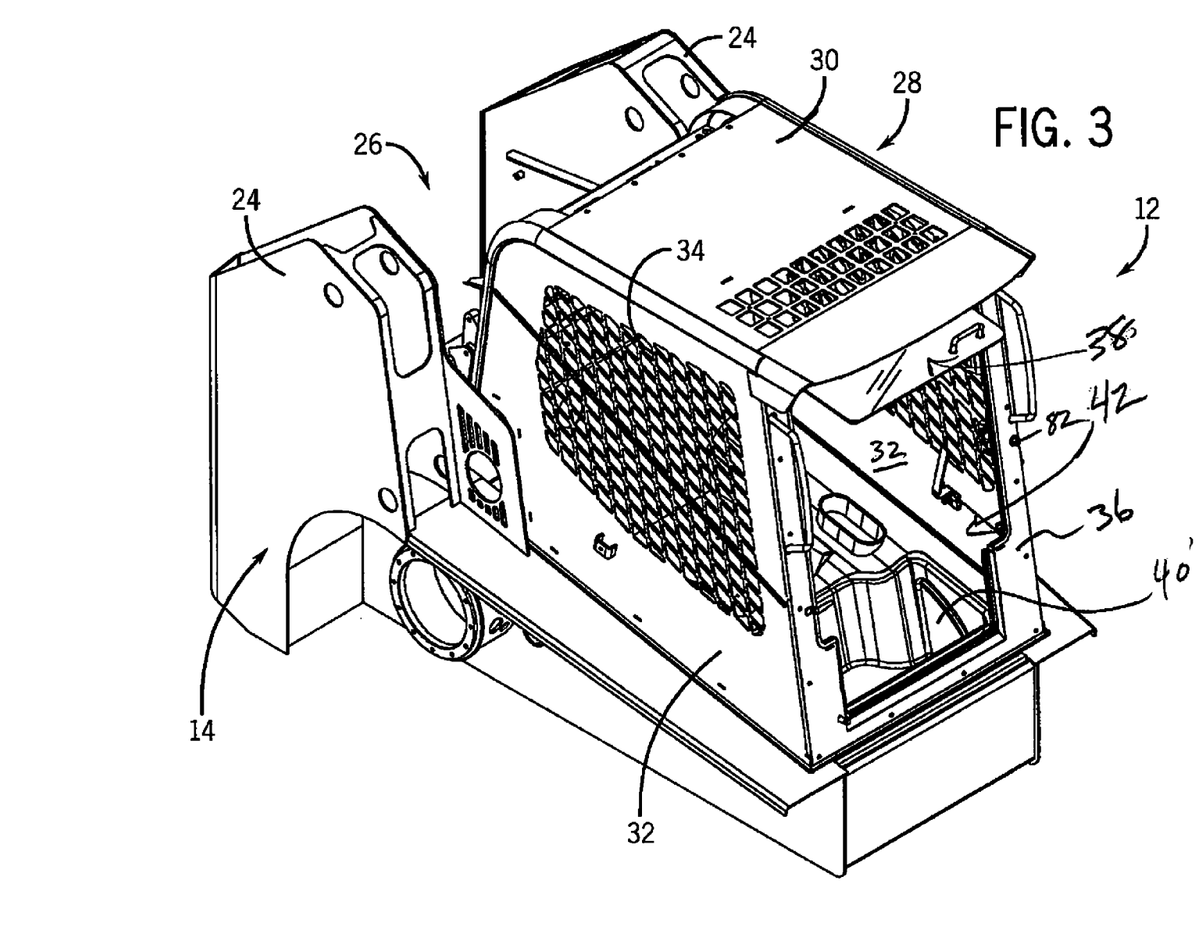
FIG. 3 is an isometric view of the operator cab mounted to the chassis of the skid steer loader shown in FIG. 1 and with the front access door in a fully open position.

Referring now to FIG. 3, the operator cab 12 may also include a tiltable foot pod 40, such as described in U.S. patent application Ser. No. 12/348,147, entitled, "Tilting Foot Pod For The Operator Cab Of A Skid Steer Vehicle", the disclosure of which is incorporated herein. In FIG. 3, the front access door 38 is shown in an open position thereby exposing a cockpit 42 that is defined by the top panel 30, side panels 32, rear panel 34, front panel 36, and the foot pod 40. The cockpit generally includes a seat (not shown) and various user-controls for controlling operation of the skid steer loader 10. The controls may be mounted to the cab frame 28, carried by the seat, or mounted to other structures contained within the cockpit 42. The foot pod 40 provides a recess for the operator to place his or her feet when seated or standing in the cockpit 42.

Figure 4:
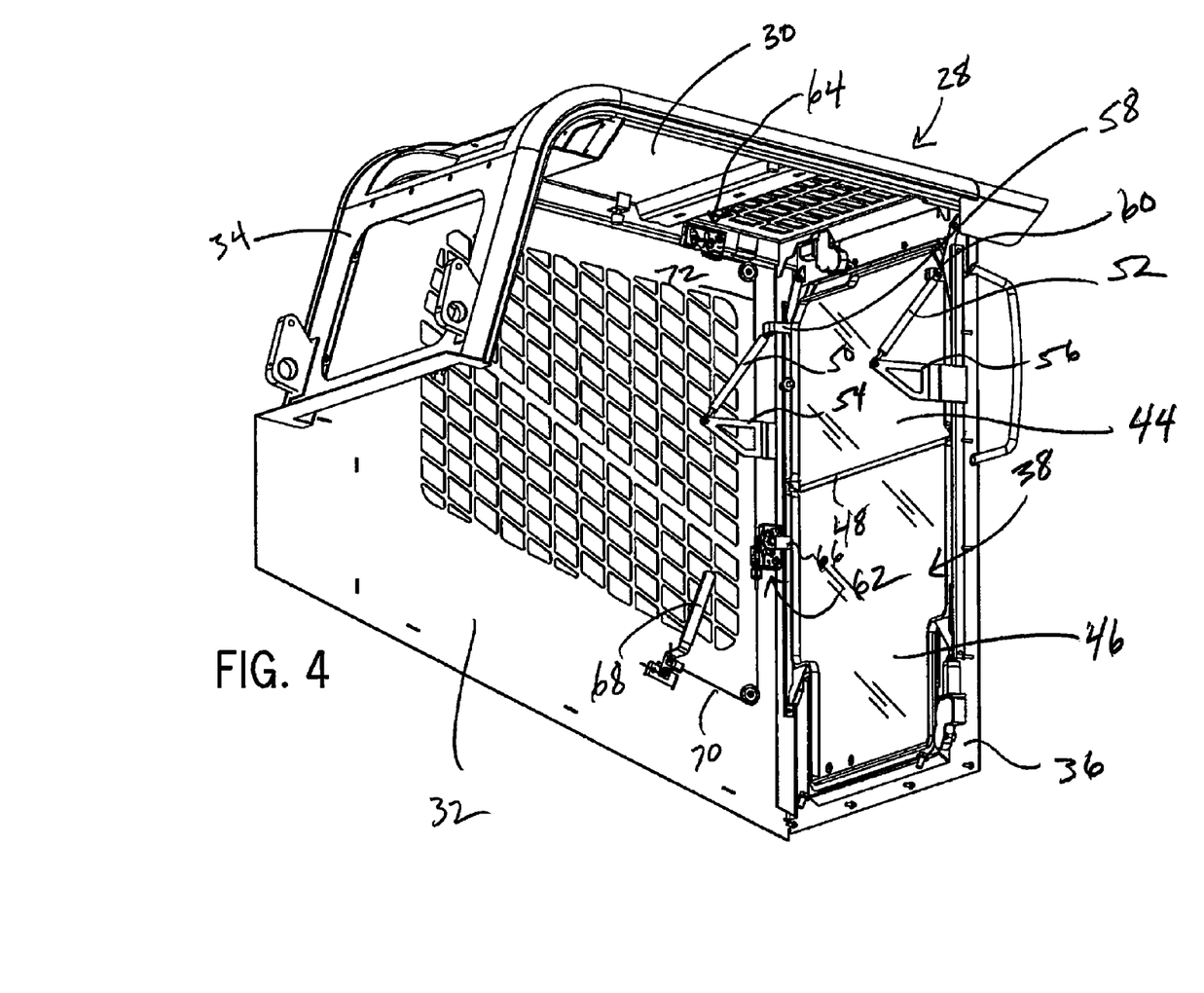
FIG. 4 is a partial rear isometric view of the operator cab shown in FIG. 1 with the front access door in the fully closed position.

FIG. 4 provides a view of the interior of the cab frame 28 with one of the side panels 32 removed and the front access door 38 in the closed position. The front access door 38 includes an upper panel 44 and a lower panel 46. The upper panel 44 and the lower panel 46 fold with respect to one another along a pin joint or 48. In the illustrated embodiment, the upper panel 44 is smaller than the lower panel 46, which results in the hinge 48 being in a somewhat elevated position relative to the front panel 36. Positioning the hinge 48 in the elevated position as shown functions to place the hinge 48 outside the line of view of the operator when the operator is sitting in the operator cab 12 and viewing the operation of the attachment secured to the working ends of the lift arms 18. The upper and lower panels are preferably made of a scratch resistant and shatter resistant transparent glass or plastic. In addition, a translucent plastic or rubber seal is located between the lower edge of upper panel 44 and the upper edge of lower panel 46, to seal the space therebetween and to provide complete visibility through the panels 44, 46 when door 38 is closed.

Figure 5:
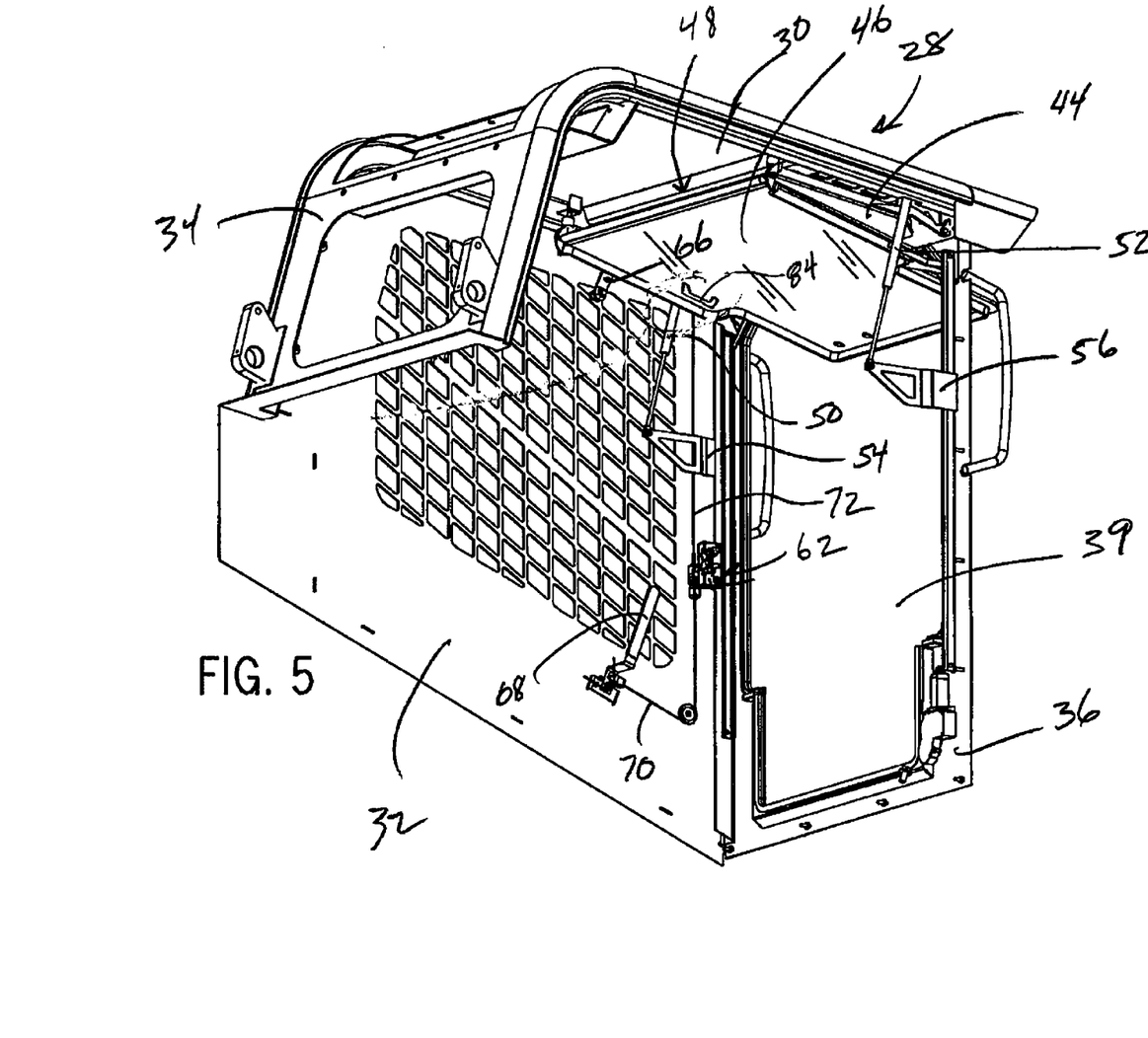
FIG. 5 is a partial rear isometric view of the operator cab shown in FIG. 1 with the front access door in the fully open position.

The upper panel 44 is connected to a pair of actuators 50 and 52, via a pair of brackets 54 and 56, respectively. The brackets 54, 56 extend inwardly into the interior volume of the cab frame 28 from the backside of the front panel 36. The actuators 50, 52 are also connected to flanges 58, 60 that extend inwardly into the volume of the cab frame 28 from the upper panel 44. As shown in FIG. 5, the flanges 58, 60 travel with the door panel 44 when the upper and lower panels 44, 46 are retracted from the closed position of FIG. 4 to the open position of FIG. 5.

The front access door 38 is locked in the closed position by a first rotor latch 62 and is locked in the open position by one or more second rotor latches 64. More particularly, a first locking tab 66 extends from the trim of the lower panel 46 and is positioned at a height so as to be received by the first rotor latch 62 when the front access door is in the fully closed position, and a second locking tab 67 is received by the second rotor latch 64 when the front access door is in the fully open position. The rotor latches 62 and 64 are connected to an actuating lever 68 by a series of cables, such as shown at 70 and 72. The actuating lever 68 is designed to unlock both of the rotor latches 62 and 64 simultaneously. Thus, the same actuating lever 68 may be used to unlock the front access door 38 from the fully open locked position (FIG. 6) and the fully closed locked position (FIG. 5).

For purposes of illustration, rotor latch 64 will be described, but it is understood that rotor latch 62 is of similar construction. The rotor latch 64 includes a latch housing 74 for a pair of opposed and pivoting arms 76, 78. When the arms 76, 78 are spaced from one another, the arms 76, 78 form a recess (not numbered) that may receive locking tab 66. As known in the art, the arms 76, 78 are interconnected such that movement of one arm causes a similar movement in the other arm. Moreover, as further known in the art, the arms 76, 78 are designed to automatically move from an open position to the closed position, shown in FIG. 6A, when suitably triggered by reception of its respective locking tab in the recess. As noted above, rotor latches 62 and 64 are connected to cables 70 and 72. This shared cabling results in both of the rotor latches 62 and 64 being either in the open position or in the closed position. Thus, latch 64 is shown in the closed position because the locking tab 66 is received in and retained by latch 62, which is shown in the corresponding closed position in FIG. 6.

Figure 6:
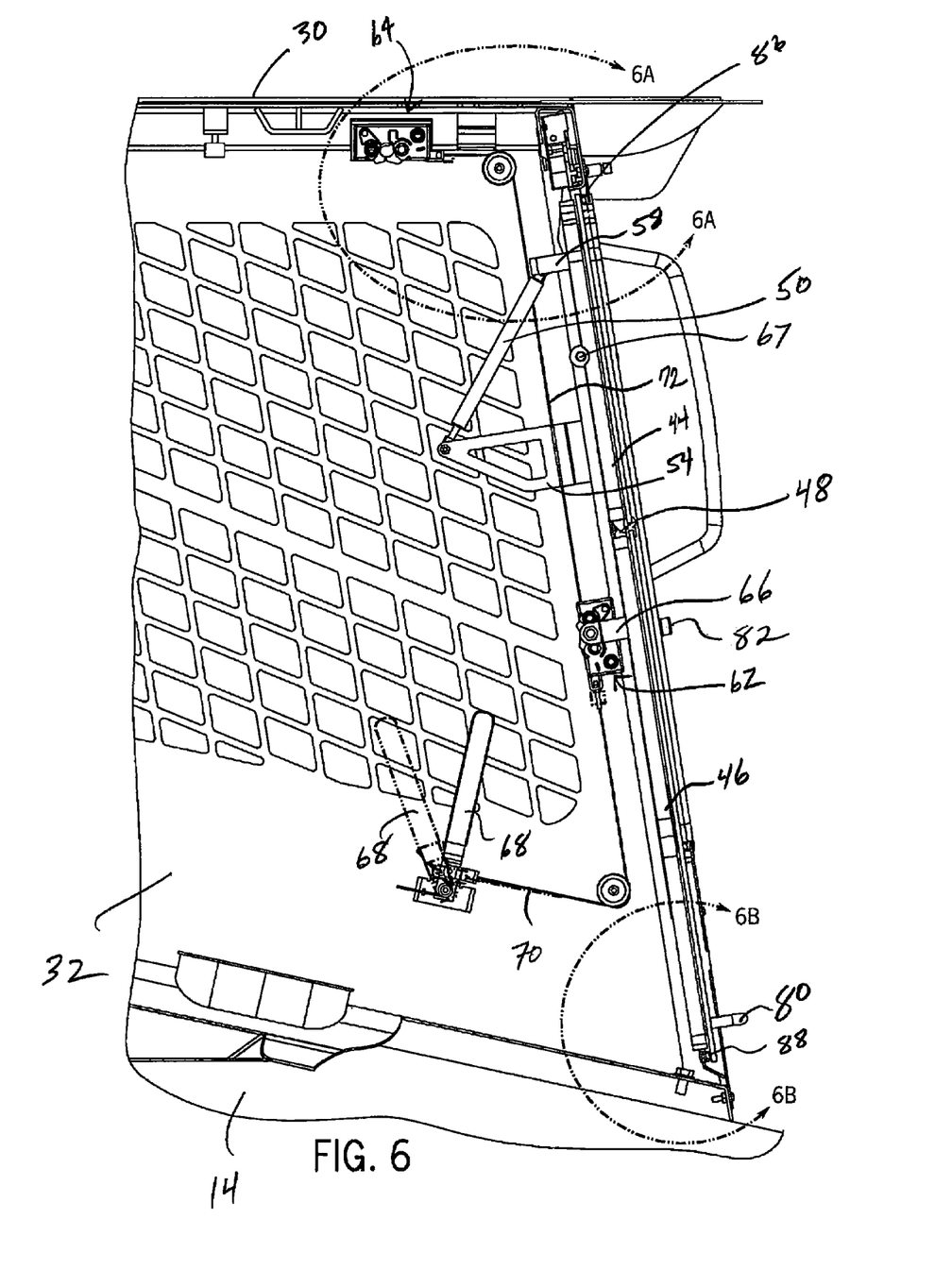
FIG. 6 is a partial side view of the operator cab shown in FIG. 1 with the front access door in the fully closed position.
Figure 6A:
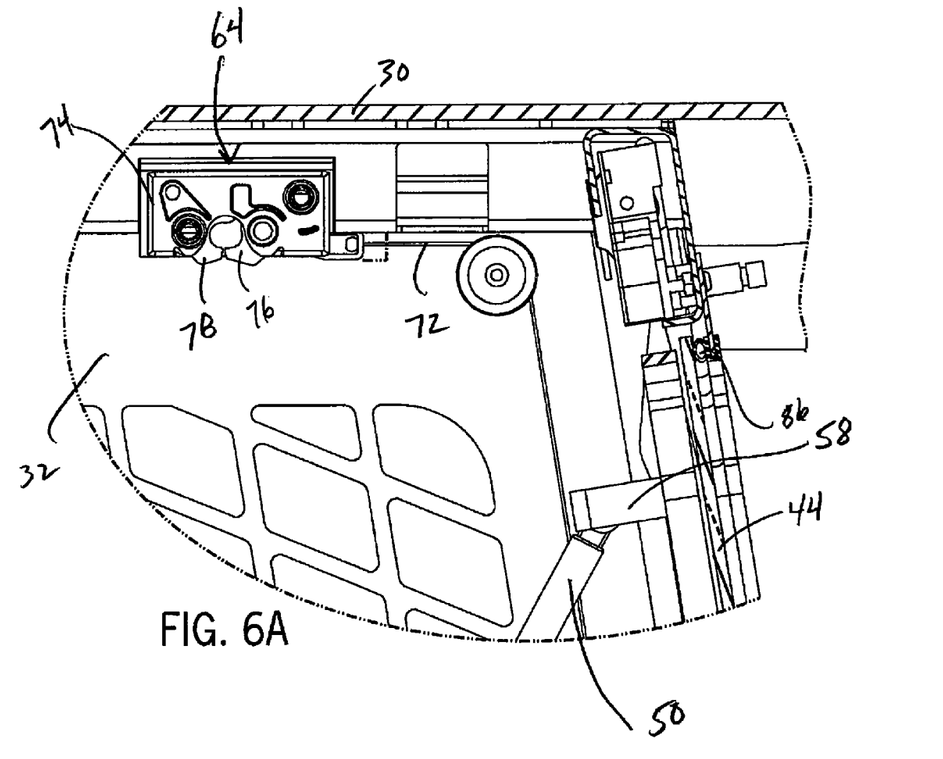
FIG. 6A is an enlarged view of the operator cab taken along line 6A-6A of FIG. 6.

The rotor latches 62 and 64 are connected to the cables 72 and 74 such that movement in one latch is replicated in the other latch. More particularly, cable 70 is interconnected between lever 68 and latch 62. Cable 72 is interconnected between latch 62 and latch 64. When lever 68 is pulled rearward by the operator, as shown in FIG. 6, cable 70 is pulled rearward. This movement of cable 70 causes the arms 76 and 78 of rotor latch 62 to separate. Moreover, cable 72 is also pulled toward latch 62 thereby causing the arms 76 and 78 of latch 64 to separate.

The rotor latches 64 may be located on one side of the front access door 38. If desired, however, a pair of rotor latches 64 may be provided one on each side of the door 38, so as to ensure that both sides of the door 38 are positively held in the open position. The actuating lever 68 may be interconnected with all of the rotor latches in order to provide actuation through the cables 70, 72.

It is also understood that, while the latches 62, 64 are shown and described as double rotor latches, the latches may also be of the single rotor type or any other type of latch that provides similar retention and release function.

Actuators 50 and 52 are preferably over-center cylinders that bias the front access door 38 in a closed position when the door 38 is near the fully closed position but also bias the door 38 toward the open position when the door 38 is near the fully open position. However, pressure is maintained in the cylinders 50, 52 such that when the rotor latches are moved from their closed positions to their open positions, the front access door 38 will "pop" inwardly. This partial open position of the front access door 38 is shown FIG. 7 which also shows that the lever 68 automatically rotates forward once the rearward bias placed thereon is removed. As a result of this movement, rotor latches 62 and 64 return to their closed positions.

Figure 7:
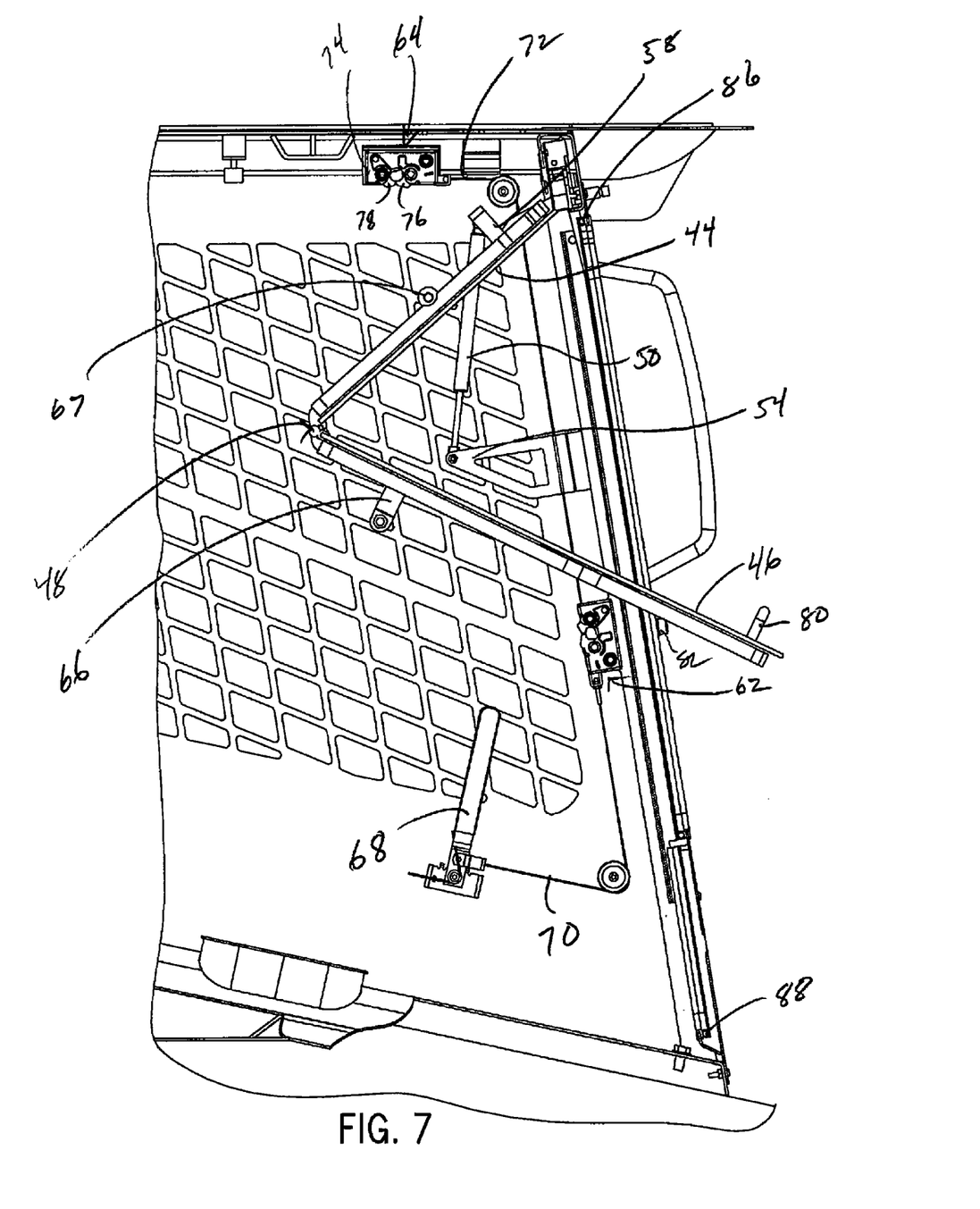
FIG. 7 is a partial side view of the operator cab shown in FIG. 1 with the front access door in a partially open position.
Figure 8:
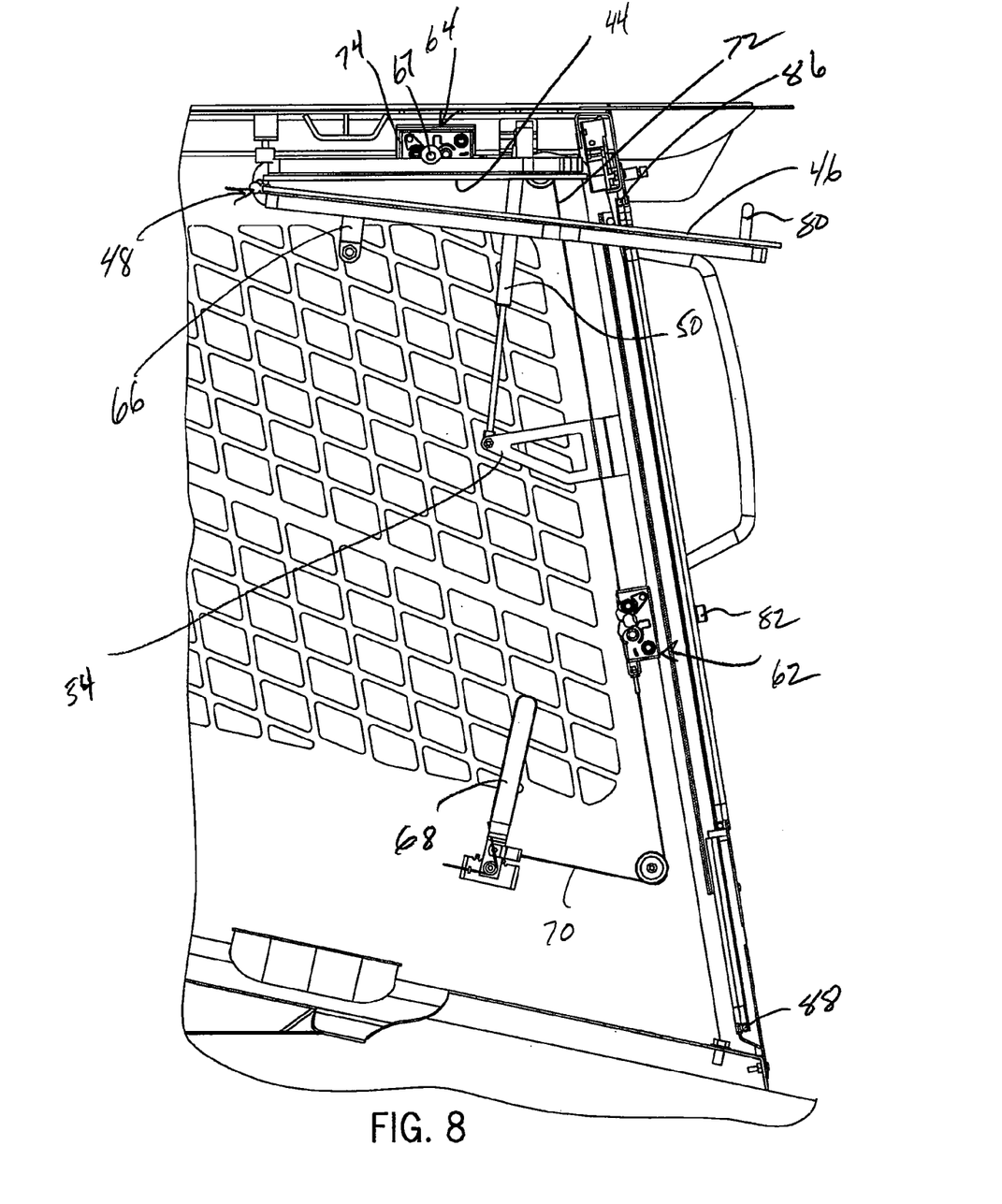
FIG. 8 is a partial side view of the operator cab shown in FIG. 1 with the front access door in the fully open position.
Figure 9:
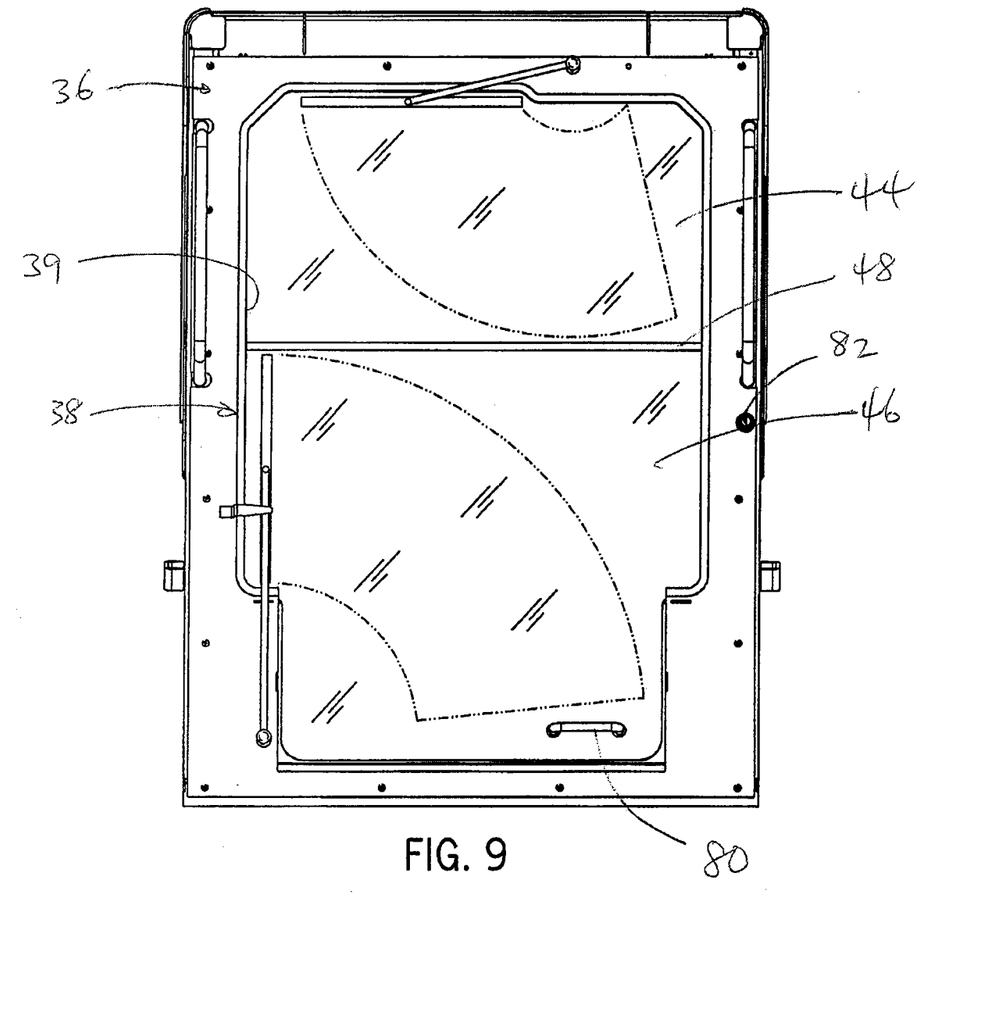
FIG. 9 is an elevation view of the operator cab of FIG. 1 showing the front access door in the fully closed position.

To lock the front access door 38 in the fully open position, an operator seated in the operator cab pulls on lever 68 which unlocks the rotor latch 62. The front access door 38 is designed to fold inwardly about hinge 48, as shown in FIG. 7. The operator may then pull the door 38 further inward and then push the door 38 upward. The connection of the actuators 50 and 52 about brackets 54 and 56, respectively, provides a support point for the front access door 38 as it is pushed toward the top panel 30. When the upper panel 44 is generally parallel with the top panel 30, further upward action on the door 38 will cause the locking tab 66 of the upper panel 44 to engage rotor latch 64, as illustrated in FIG. 8. The hinge 48 is designed to hold the lower panel 46 in the raised and folded position when the locking tab 67 is engaged by the rotor latch assembly 64. The double acting nature of the actuators 50, 52 also biases the upper panel 44 in the raised position.

Figure 6B:
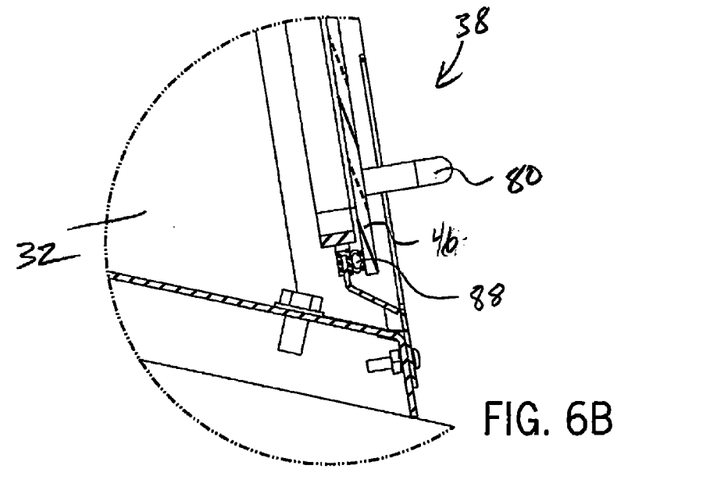
FIG. 6B is an enlarged view of the operator cab taken along line 6B-6B of FIG. 6.

Referring briefly to FIG. 6B, the front access door 38 includes a handle 80 bolted to the outside surface of the lower panel 46. The handle 80 allows the lower panel 46 to be pulled upward, which as shown in FIG. 8, which causes the door 38 to fold inwardly as described above. Similarly, the handle 80 may be used to pull the lower panel 46 downward so as to unfold the door 38 and lock the door 38, via rotor latch 62, in the fully closed position shown in FIG. 6. As further shown in FIG. 6, the rotor latches 62, 64 are interconnected via the cables 72, 74 with a push button 82 that allows the rotor latches 62, 64 to be unlocked from outside the operator cab.

One skilled in the art will appreciate that the rotor latch 64 is configured to hold the access door 38 in the raised and fully open position thereby allowing the skid steer vehicle to be operated with the front access door 38 locked open.

Referring briefly again to FIG. 5, a handle 84 is mounted to the interior surface of the front access door 38 and, preferably, to the interior surface of the lower panel 46. The handle 84 may be gripped by operator when in the operator cab to pull and lift the front access door 38 from the closed position to the open position, and vice-versa.

It is appreciated that other types of latches may be used to lock the front access door in the fully open and the fully closed positions.

Additionally, it is contemplated that the front access door 38 may include wipers associated with the upper and lower panels 44, 46 to improve visibility for the operator during inclement weather. It is contemplated that the wipers could be mounted to the panels themselves and thus move with the panels when the door is retracted into the interior of the operator cab. Alternatively, the wipers could be mounted to the front panel.

As illustrated in FIGS. 6-7, the upper panel 44 is pressed against the interior side of front panel 36 whereas lower panel 46 is held against the exterior side of front panel 36 when the front access door 38 is in the fully closed position. In one preferred embodiment, the upper panel 44 is pressed against an upper seal 86 affixed to the interior surface of the front panel 36 and the lower panel 46 is held against a lower seal 88 affixed to the exterior surface of the front panel 36.

The present invention has been described with respect to an operator cab of a skid steer vehicle, but is understood that the invention may be applicable with the operator cabs of other types of vehicles and particularly other types of construction and agricultural vehicles that are commonly operated in dusty or noisy conditions.

Various alternatives and embodiments are contemplated as being within the scope of the following claims particularly pointing out and distinctly claiming the subject matter regarded as the invention.

We claim:

1. An operator cab for a skid steer vehicle, the operator cab comprising:
   a cab frame that is positioned on a chassis of the skid steer vehicle, the cab frame having an upper frame portion, a lower frame portion, and a pair of side portions that together with the upper frame portion and the lower frame portion collectively define an interior, wherein the cab frame defines a front access opening between the pair of side portions that provides access to the cab frame interior;
   a front panel secured to the cab frame and configured to selectively open and close the front access opening, wherein the front panel includes an upper panel section and a lower panel section that are pivotably connected together and are configured to fold inwardly at least partially into the interior of the of the cab frame to permit ingress and egress through the front access opening; and
   a latch arrangement for selectively maintaining the front panel in either a closed position or an open position, wherein the latch arrangement includes:
      an upper latch located toward the upper frame portion of the cab frame and a lower latch adjacent the front access opening;
      at least one engagement member carried by the front panel, wherein the at least one engagement member is selectively engageable with the upper latch for maintaining the front panel in the open position and with the lower latch for maintaining the front panel in the closed position; and
      an actuator interconnected with the upper latch and with the lower latch, wherein the actuator is operable to selectively disengage the at least one engagement member from the upper latch and the lower latch to enable movement of the front panel between the open and closed positions.

2. The operator cab of claim 1 further comprising a biasing member that biases the front panel in a partial open position and wherein the front panel may be moved to the closed position when the bias of the biasing member is overcome.

3. The operator cab of claim 2 wherein the actuator comprises a single actuator that is interconnected with both the upper latch and the lower latch to selectively disengage the at least one engagement member from both the upper latch and the lower latch.

4. The operator cab of claim 2 wherein the biasing member automatically draws the front panel inwardly toward the interior of the cab frame when the front panel is released from engagement with lower latch.

5. The operator cab of claim 4 wherein the biasing member automatically draws the front panel toward the closed position when the front panel is released from engagement with the upper latch.

6. The operator cab of claim 3 wherein the single actuator comprises a release lever positioned within the interior of the cab frame and a cable system connected to the release lever and the upper and the lower latches, and wherein operation of the release lever interacts with the cable system to release the upper and the lower latches to release the at least one engagement member from engagement with the upper and lower latches.

7. The operator cab of claim 1 wherein the at least one engagement member comprises a first locking member mounted to the lower panel section and a second locking member mounted to the upper panel section, and wherein the first locking member is received by the first lower latch when the front panel is secured in the closed position and wherein the second locking member is received by the upper latch when the front panel is secured in the open position.

8. The operator cab of claim 1 further comprising a first handle mounted to an interior side of the front panel and a second handle mounted to an exterior side of the front panel.

9. The operator cab of claim 1 further comprising a first wiper coupled to the upper panel section and a second wiper coupled to the lower panel section.

10. The operator cab of claim 1 wherein the skid steer vehicle is operable with the front panel in either the open position or the closed position.

11. A skid steer vehicle comprising:
a chassis;
an operator cab mounted to the chassis, the operator cab defining a work space for an operator controlling the skid steer vehicle;
an access door coupled to the frame for movement between an open position and a closed position, wherein the access door is configured to retract into the work space from the closed position toward a retracted position, wherein the access door includes an upper door panel and a lower door panel connected to the upper door panel in a manner that allows the door panels to pivot relative to one another when the access door is being moved from the closed position to the open position; and
an over-center biasing member that biases the access door toward the retracted position and wherein the bias of the over-center biasing member must be overcome to secure the access door in either the closed position or the open position.

12. The skid steer vehicle of claim 11 wherein the operator cab comprises an upper frame member and wherein the upper panel of the access door is generally parallel with the upper frame member when the access door is in the open position.

13. The skid steer vehicle of claim 11 further comprising a handle mounted to the access door and accessible from outside the work space to allow an operator to lift the access door inwardly into the work space.

14. The skid steer vehicle of claim 11 further comprising a first latch assembly and a second latch assembly associated with the access door and wherein the first latch assembly locks the access door in the closed position and the second latch assembly locks the access door in the open position.

15. The skid steer vehicle of claim 14 wherein the first latch assembly and the second latch assembly each comprises a rotor latch.

16. An operator cab for a skid steer vehicle comprising:
a cab frame defining a cockpit and a front access opening into the cockpit; and
a door coupled to the frame and operable to selectively open and close the opening, wherein the door includes an upper door member having a transparent upper window and a lower door member having a transparent lower window, wherein the upper door member and the lower door member are pivotably connected together and fold inwardly into the cockpit to an open position in order to permit ingress to or egress from the cockpit through the front access opening, and wherein the upper door member and the lower door member unfold outwardly to a closed position in which the upper door member and the lower door member cooperate to close the access opening;
wherein the upper window terminates in a transparent lower edge and wherein the lower window terminates in a transparent upper edge, wherein the transparent lower edge of the upper window and the transparent upper edge of the lower window are located adjacent each other when the door is in the closed position and cooperate to define a transparent interface between the upper and lower door members.

17. The operator cab of claim 16 further comprising an off-centered cylinder interconnected between the cab frame and the door and operative to bias the door closed when the door is in the closed position and bias the door open when the door is in the open position.

18. The operator cab of claim 16 further comprising an upper wiper carried by the upper door member and configured to wipe the upper window, and a lower wiper carried by the lower door member and configured to wipe the lower window.

19. The operator cab of claim 16 further comprising a first latch that locks the door in the closed position and a second latch that locks the door in the open position.

20. The operator cab of claim 19 further comprising a lever linked with the first and the second latches and operative to release the door from the first and second latches.

21. An operator cab for a skid steer vehicle, the operator cab comprising:
a cab frame that is positioned on a chassis of the skid steer vehicle, the cab frame having an upper frame portion, a lower frame portion, and a pair of side portions that together with the upper frame portion and the lower frame portion collectively define an interior;
a front panel to selectively open and close an opening into the interior, the front panel adapted to fold inwardly at least partially into the interior of the of cab frame to a position that is substantially parallel to the upper frame portion to permit ingress and egress through the opening; and
a biasing member that biases the front panel in a partial open position and wherein the front panel may be moved to a closed position when the bias of the biasing member is overcome.

22. The operator cab of claim 21 wherein the biasing member includes a cylinder operatively associated with an extendable and retractable rod.

23. The operator cab of claim 22 further comprising a first latch assembly adapted to lock the front panel in a closed position and a second latch assembly adapted to lock the front panel in an open position, and wherein the biasing member automatically draws the front panel inwardly toward the interior of the cab frame when the front panel is released from engagement with the first latch assembly.

24. The operator cab of claim 23 wherein the biasing member automatically draws the front panel toward the closed position when the front panel is released from engagement with the second latch assembly.

25. The operator cab of claim 24 further comprising a lever positioned within the interior of the cab frame and a cable system connected to the handle and the first and the second latch assemblies, and wherein operation of the lever interacts with the cable system to unlock the first and the second latch assemblies to release the front panel from engagement with the first and the second latch assemblies.

26. The operator cab of claim 23 wherein the front panel includes an upper panel member and a lower panel member connected to the lower panel member by a hinge, and further comprising a first locking pin mounted to the lower panel member and a second locking pin mounted to the upper panel member, and wherein the first locking pin is received by the first latch assembly when the front panel is secured in a closed position and wherein the second locking pin is received by the second latch assembly when the front panel is secured in a fully open position.

27. The operator cab of claim 16, wherein the upper and lower door members are coplanar when in the closed position.

\* \* \* \* \*

UNITED STATES PATENT AND TRADEMARK OFFICE
CERTIFICATE OF CORRECTION

PATENT NO. : 8,016,345 B1
APPLICATION NO. : 12/348145
DATED : September 13, 2011
INVENTOR(S) : Aaron Goddard et al.

Page 1 of 1

It is certified that error appears in the above-identified patent and that said Letters Patent is hereby corrected as shown below:

CLAIM 7, column 7, line 13, delete "first".

Signed and Sealed this
Eighth Day of November, 2011

David J. Kappos
*Director of the United States Patent and Trademark Office*